United States Patent
Lee

(10) Patent No.: US 10,515,305 B2
(45) Date of Patent: Dec. 24, 2019

(54) RECOGNITION APPARATUS BASED ON NEURAL NETWORK AND METHOD OF TRAINING NEURAL NETWORK

(71) Applicant: SAMSUNG ELECTRONICS CO., LTD., Suwon-si (KR)

(72) Inventor: Jun Haeng Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 753 days.

(21) Appl. No.: 15/195,302

(22) Filed: Jun. 28, 2016

(65) Prior Publication Data
US 2017/0213129 A1     Jul. 27, 2017

(30) Foreign Application Priority Data
Jan. 26, 2016  (KR) .................. 10-2016-0009353

(51) Int. Cl.
*G06N 3/08* (2006.01)
*G06N 3/04* (2006.01)

(52) U.S. Cl.
CPC ............... *G06N 3/08* (2013.01); *G06N 3/04* (2013.01); *G06N 3/049* (2013.01); *G06N 3/084* (2013.01)

(58) Field of Classification Search
CPC .......... G06N 3/08; G06N 3/04; G06N 3/049; G06N 3/084
See application file for complete search history.

(56) References Cited

U.S. PATENT DOCUMENTS

| | | | |
|---|---|---|---|
| 7,979,370 B1 * | 7/2011 | Ershov | G06F 17/2785 706/20 |
| 8,924,322 B2 | 12/2014 | Datta et al. | |
| 8,943,008 B2 | 1/2015 | Ponulak et al. | |
| 9,015,096 B2 | 4/2015 | Hunzinger | |
| 9,195,934 B1 | 11/2015 | Hunt et al. | |
| 2002/0038294 A1 * | 3/2002 | Matsugu | G06K 9/00973 706/20 |

(Continued)

FOREIGN PATENT DOCUMENTS

WO   2014081671 A1   5/2014

OTHER PUBLICATIONS

Bohte et al, Error-backpropagation in temporally encoded networks of spiking neurons , 2002, Neurocomputing, 48 (Year: 2002).*

(Continued)

*Primary Examiner* — Austin Hicks
(74) *Attorney, Agent, or Firm* — Sughrue Mion, PLLC

(57) ABSTRACT

A recognition apparatus and a training method are provided. The recognition apparatus includes a memory configured to store a neural network including a previous layer of neurons, and a current layer of neurons that are activated based on first synaptic signals and second synaptic signals, the first synaptic signals being input from the previous layer, and the second synaptic signals being input from the current layer. The recognition apparatus further includes a processor configured to generate a recognition result based on the neural network. An activation neuron among the neurons of the current layer generates a first synaptic signal to excite or inhibit neurons of a next layer, and generates a second synaptic signal to inhibit neurons other than the activation neuron in the current layer.

35 Claims, 11 Drawing Sheets

(56) References Cited

U.S. PATENT DOCUMENTS

| | | |
|---|---|---|
| 2009/0313195 A1 | 12/2009 | McDaid et al. |
| 2013/0204814 A1 | 8/2013 | Hunzinger et al. |
| 2014/0025613 A1 | 1/2014 | Ponulak |
| 2014/0032458 A1 | 1/2014 | Sinyavskiy et al. |
| 2014/0143193 A1 | 5/2014 | Zheng et al. |
| 2014/0156577 A1 | 6/2014 | Eliasmith et al. |
| 2014/0180187 A1 | 6/2014 | Croizat et al. |
| 2015/0347897 A1 | 12/2015 | Modha |

OTHER PUBLICATIONS

Diehl et al: "Fast-Classifying, High-Accuracy Spiking Deep Networks Through Weight and Threshold Balancing", IEEE International Joint Conference on Neural Networks (IJCNN), 2015 (8 pages total).

Jinling Wang et al., "An online supervised learning method for spiking neural networks with adaptive structure", Neurocomputing, vol. 144, (2014), (pp. 526-536), XP029045939.

Wulfram Gerstner et al., "4.2 Spike response model (SRM)", Spiking Neuron Models: Single Neurons, Populations, Plasticity; Cambridge University Press, 2002, (16 Pages Total), XP055380434.

Geoffrey J. Goodhill et al., "The Role of Weight Normalization in Competitive Learning", Neural Computation, vol. 6, 1994, (10 Pages Total), XP055380728.

Ioana Sporea et al., "Supervised Learning in Multilayer Spiking Neural Networks", Letter, Communicated by Sander M. Bohte, Neural Computation, vol. 25, (2013), Massachusetts Institute of Technology, (pp. 473-509), XP055185012.

Jun Haeng Lee et al., "Training Deep Spiking Neural Networks using Backpropagation", arxiv.org, Cornell University Library, 201 Olin Library Cornell University Ithaca, NY 14853, Aug. 2016, (10 Pages Total), XP080723420.

Communication dated Jun. 20, 2017, from the European Patent Office in counterpart European Application No. 16205658.4.

Communication dated Oct. 4, 2019 issued by the European Patent Office in counterpart European Application No. 16 205 658.4.

Saeed Afshar et al., "Turn Down That Noise: Synaptic Encoding of Afferent SNR in a Single Spiking Neuron", IEEE Transactions on Biomedical Circuits and Systems, vol. 9, No. 2, Apr. 2015, pp. 188-196, 9 pages total, XP011579737.

\* cited by examiner

→ Input synapses
—• Lateral inhibitory synapses

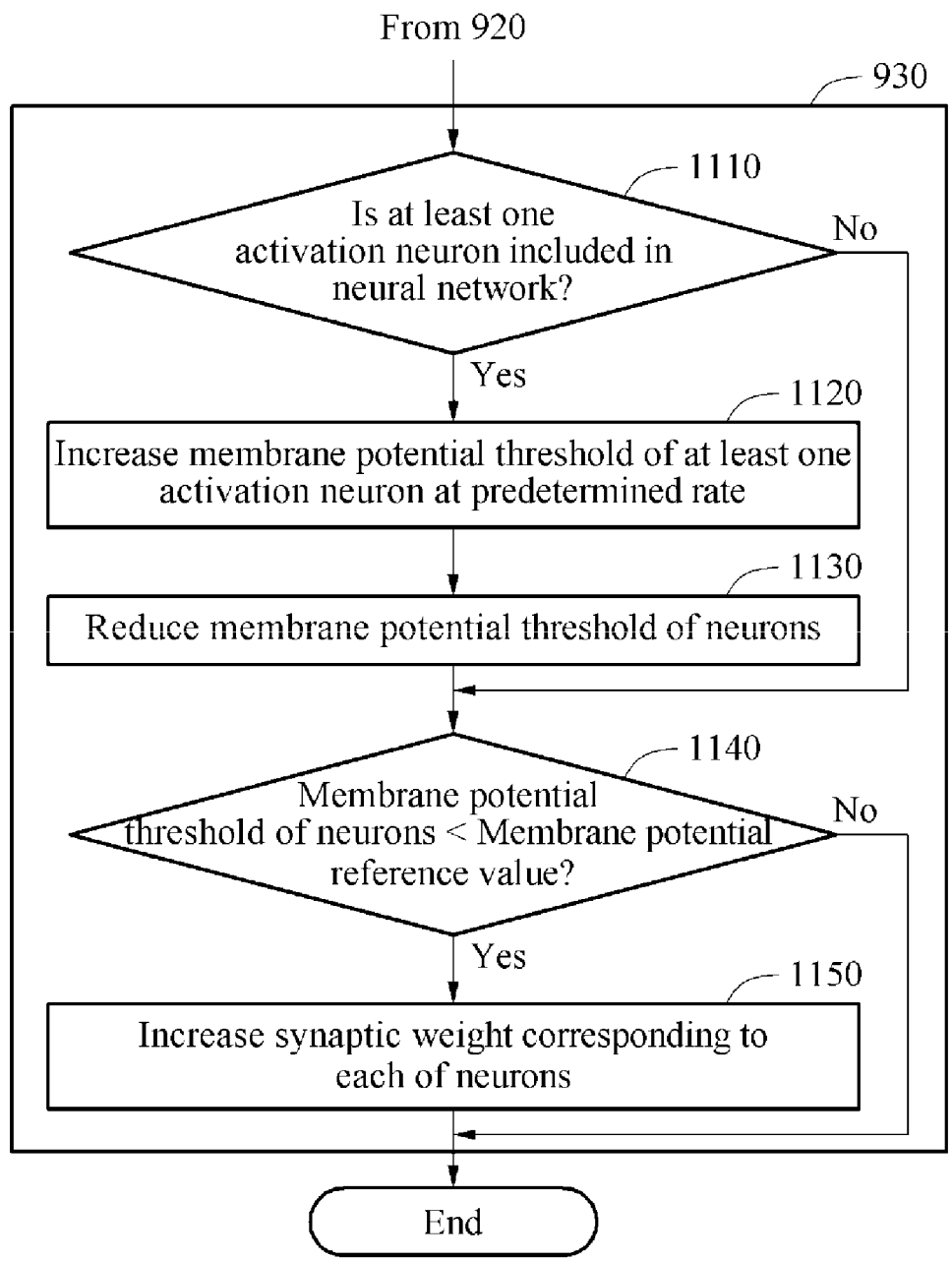

RECOGNITION APPARATUS BASED ON NEURAL NETWORK AND METHOD OF TRAINING NEURAL NETWORK

CROSS-REFERENCE TO RELATED APPLICATION

This application claims priority from Korean Patent Application No. 10-2016-0009353, filed on Jan. 26, 2016 in the Korean Intellectual Property Office, the disclosure of which is incorporated herein by reference in its entirety.

BACKGROUND

1. Field

Methods and apparatuses consistent with exemplary embodiments relate to a recognition apparatus based on a neural network and a method of training the neural network.

2. Description of the Related Art

A brain contains hundreds of billions of nerve cells, that is, neurons, and neurons are connected to each other in a complex neural network. A neuron shows an intellectual capability, for example, learning or memory, using synapses that exchange signals with thousands of other neurons. A neuron functions as a structural and functional unit of a nervous system and a basic unit of information transfer. A synapse refers to a junction between neurons and a portion in which an axon of one neuron is connected to a dendrite of another neuron. A single neuron is connected to thousands of other neurons via synapses. A spiking neural network (SNN) with an operating scheme similar to that of a biological brain operates based on events, and accordingly is expected to be better in terms of efficiency. However, there is no method of training a multi-layer deep spiking neural network.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a recognition apparatus including a memory configured to store a neural network including a previous layer of neurons, and a current layer of neurons that are activated based on first synaptic signals and second synaptic signals, the first synaptic signals being input from the previous layer, and the second synaptic signals being input from the current layer. The recognition apparatus further includes a processor configured to generate a recognition result based on the neural network. An activation neuron among the neurons of the current layer generates a first synaptic signal to excite or inhibit neurons of a next layer, and generates a second synaptic signal to inhibit neurons other than the activation neuron in the current layer.

The neurons of the current layer may include spiking neurons.

The activation neuron may adjust a membrane potential of the other neurons based on the first synaptic signals and the second synaptic signals.

The activation neuron may transmit the second synaptic signal to the other neurons based on a lateral inhibition coefficient of the activation neuron.

A neuron receiving the second synaptic signal among the other neurons may decrease a membrane potential of the neuron based on a membrane potential threshold of the neuron and the lateral inhibition coefficient.

The previous layer may include a group of neurons, and the neurons included in the group may share a receptive field.

The current layer may include another group of neurons, the other group corresponding to the receptive field, and each of the neurons sharing the receptive field may be connected to all of the neurons included in the other group corresponding to the receptive field.

The processor may be further configured to determine an exponential decay term for the neurons included in the group, and determine a membrane potential of each of the neurons included in the group, based on the exponential decay term.

A membrane potential of the neurons of the current layer may be within a range based on a membrane potential threshold of the neurons of the current layer.

The processor may be further configured to change a membrane potential time constant value of neurons included in the neural network based on a result of a comparison between a magnitude of input signals that are input to the neuron network and a reference value.

The processor may be further configured to increase the membrane potential time constant value of the neurons included in the neural network in response to the magnitude of the input signals being less than a first reference value.

The processor may be further configured to decrease a membrane potential time constant value of neurons included in a first layer among previous layers of neurons in response to the magnitude of the input signals being greater than a second reference value.

The first synaptic signals may be input over time, and a membrane potential of the neurons of the current layer may change based on a weight of synapses corresponding to the first synaptic signals.

In response to the first synaptic signals not being input, a membrane potential of the neurons of the current layer may be decreased at a rate over time.

The activation neuron may output a spike signal in response to a membrane potential of the activation neuron exceeding a membrane potential threshold of the activation neuron, and the membrane potential of the activation neuron may be decreased in response to the spike signal being output.

The membrane potential of the activation neuron may be decreased by a value proportional to the membrane potential threshold of the activation neuron, or the membrane potential of the activation neuron may be decreased by a rate proportional to the membrane potential threshold of the activation neuron.

A value of a lateral inhibition coefficient of the activation neuron may be determined based on a weight of synapses corresponding to each of the neurons of the current layer.

According to an aspect of another exemplary embodiment, there is provided a training method including applying training data to an input layer of a neural network, the training data including events over time, acquiring an output value of an output layer of the neural network, and training the neural network based on the output value and a desired value corresponding to the training data.

The neural network may include a previous layer of neurons, and a current layer of neurons that are activated based on input synaptic signals that are input from the previous layer and a lateral inhibition signal that are input from a current layer, and an activation neuron among the neurons of the current layer may excite or inhibit neurons of a next layer, and inhibit neurons other than the activation neuron in the current layer.

The training may include determining an output activity of a neuron included in the neural network based on input activities of the neuron, a membrane potential reset factor of the neuron, and a membrane potential threshold of the neuron, and determining a parameter of neurons included in the neural network based on the output activity of the neuron included in the neural network.

The parameter may include at least one among the membrane potential threshold of the neuron, input synaptic weights of the neuron, output synaptic weights of the neuron, and a lateral inhibition coefficient of the neuron.

The training may further include adjusting the output activity of the neuron based on the membrane potential reset factor of the neuron, the lateral inhibition coefficient of the neuron, a lateral discount factor of the neuron, and output activities of neurons other than the neuron in a group of neurons.

The lateral inhibition coefficient of the neuron is determined based on the input synaptic weights of the neuron.

The training may include changing a membrane potential time constant value of neurons included in the neural network based on a result of a comparison between a magnitude of input signals that are input to the neural network and a reference value.

The changing may include increasing the membrane potential time constant value of the neurons in response to the magnitude of the input signals being less than a first reference value.

The changing may include decreasing a membrane potential time constant value of neurons included in a first layer among previous layers of neurons in response to the magnitude of the input signals being greater than a second reference value.

The training may include determining a loss that is propagated back to the neural network, based on the desired value and the output value, and determining a parameter of neurons included in the neural network based on the loss and a gradient descent scheme that is based on an output activity of the neurons.

The training may include comparing a sum of squares of input synaptic weights of a neuron included in the neural network to a weight reference value, determining a weight regulation rate based on a result of the comparing, and decreasing the input synaptic weights based on the weight regulation rate.

The determining of the weight regulation rate may include increasing the weight regulation rate in response to the sum of the squares being greater than the weight reference value, and decreasing the weight regulation rate in response to the sum of the squares being less than or equal to the weight reference value.

The training may include regulating a membrane potential threshold of neurons included in the neural network based on whether the neurons are activated.

The regulating may include increasing a membrane potential threshold of an activation neuron among the neurons at a rate.

The regulating may include decreasing a membrane potential threshold of the neurons based on a number of neurons sharing a receptive field in a previous layer of neurons and a number of activation neurons included in the previous layer.

The regulating may include increasing a synaptic weight corresponding to each of neurons included in the neural network in response to a membrane potential threshold of the neurons being less than a membrane potential reference value.

The training may include initializing at least one among a membrane potential threshold and synaptic weights of neurons included in a layer of the neural network based on a number of synapses corresponding to each of the neurons.

The training may include normalizing a backpropagation error so that an update value of synaptic weights of neurons included in the neural network is equal to an update value of a membrane potential threshold of the neurons.

A non-transitory computer-readable storage medium may store a program including instructions to cause a processor to perform the training method.

According to an aspect of another exemplary embodiment, there is provided a recognition apparatus including a memory configured to store a neural network including a previous layer of first neurons, and a current layer of second neurons receiving first input signals and second input signals, the first input signals being received from the previous layer, and the second input signals being received from the current layer. The recognition apparatus further includes a processor configured to generate a recognition result based on the neural network. An activation neuron among the second neurons receives a first input signal among the first input signals, and generates a first output signal to excite or inhibit third neurons of a next layer, and generates a second output signal to inhibit neurons other than the activation neuron of the current layer, in response to a potential of the first input signal being greater than a threshold.

Each of the other neurons may receive the second output signal from the activation neuron, and decrease a potential of a respective one of the other neurons by a product of a potential threshold of the respective one of the other neurons and a lateral inhibition coefficient of the activation neuron.

BRIEF DESCRIPTION OF THE DRAWINGS

The above and other aspects of exemplary embodiments will become apparent and more readily appreciated from the following detailed description of the exemplary embodiments, taken in conjunction with the accompanying drawings of which:

FIG. 11 is a flowchart illustrating a scheme of regulating a membrane potential threshold in the scheme of FIG. 9.

DETAILED DESCRIPTION

Figure 1:
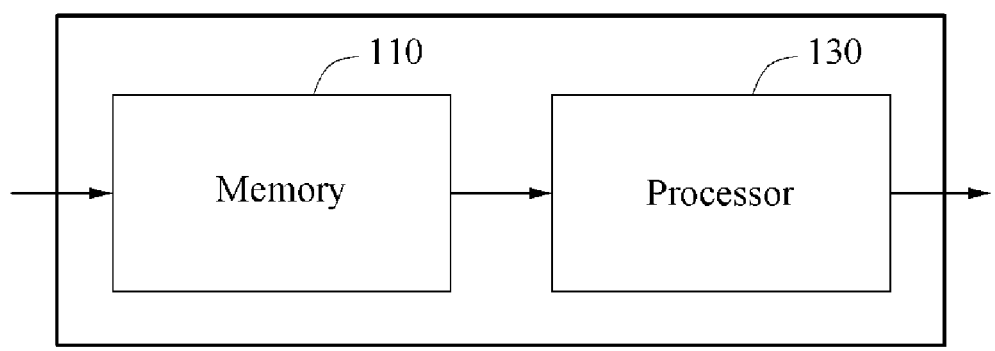
FIG. 1 is a block diagram illustrating a configuration of a recognition apparatus according to an exemplary embodiment.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

Structural or functional descriptions of exemplary embodiments are intended for the purpose of describing exemplary embodiments, and the exemplary embodiments may be implemented in various forms. However, it may be understood that these exemplary embodiments are not construed as limited to the illustrated forms, and include all changes, equivalents or alternatives within the technical idea of the present disclosure.

Although terms of "first" or "second" are used to explain various components, the components are not limited to the terms. These terms may be used only to distinguish one component from another component. For example, a "first" component may be referred to as a "second" component, or similarly, the "second" component may be referred to as the "first" component within the scope of the right according to the concept of the present disclosure.

It may be understood that when a component is referred to as being "connected" or "coupled" to another component, it can be directly connected or coupled to the other component, or intervening components may be present.

As used herein, the singular forms are intended to include the plural forms as well, unless the context clearly indicates otherwise. It may be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

In addition, the terms such as "unit," "-er (-or)," and "module" described in the specification refer to an element for performing at least one function or operation, and may be implemented in hardware, software, or the combination of hardware and software.

Unless otherwise defined herein, all terms used herein including technical or scientific terms have the same meanings as those generally understood by one of ordinary skill in the art. Terms defined in dictionaries generally used may be construed to have meanings matching with contextual meanings in the related art and are not to be construed as an ideal or excessively formal meaning unless otherwise defined herein.

In the following description, exemplary embodiments may be used to recognize a user or biosignals of the user. Exemplary embodiments may be implemented as various products, for example, personal computers (PC), laptop computers, tablet computers, smartphones, televisions (TVs), smart home appliances, intelligent vehicles, kiosks, or wearable devices. For example, exemplary embodiments may be employed to perform user authentication in a smartphone, a mobile device or a smart home system. Exemplary embodiments may be applied to a payment service through user authentication. Also, exemplary embodiments may be applied to an intelligent vehicle system to perform user authentication and to automatically start.

Figure 2:
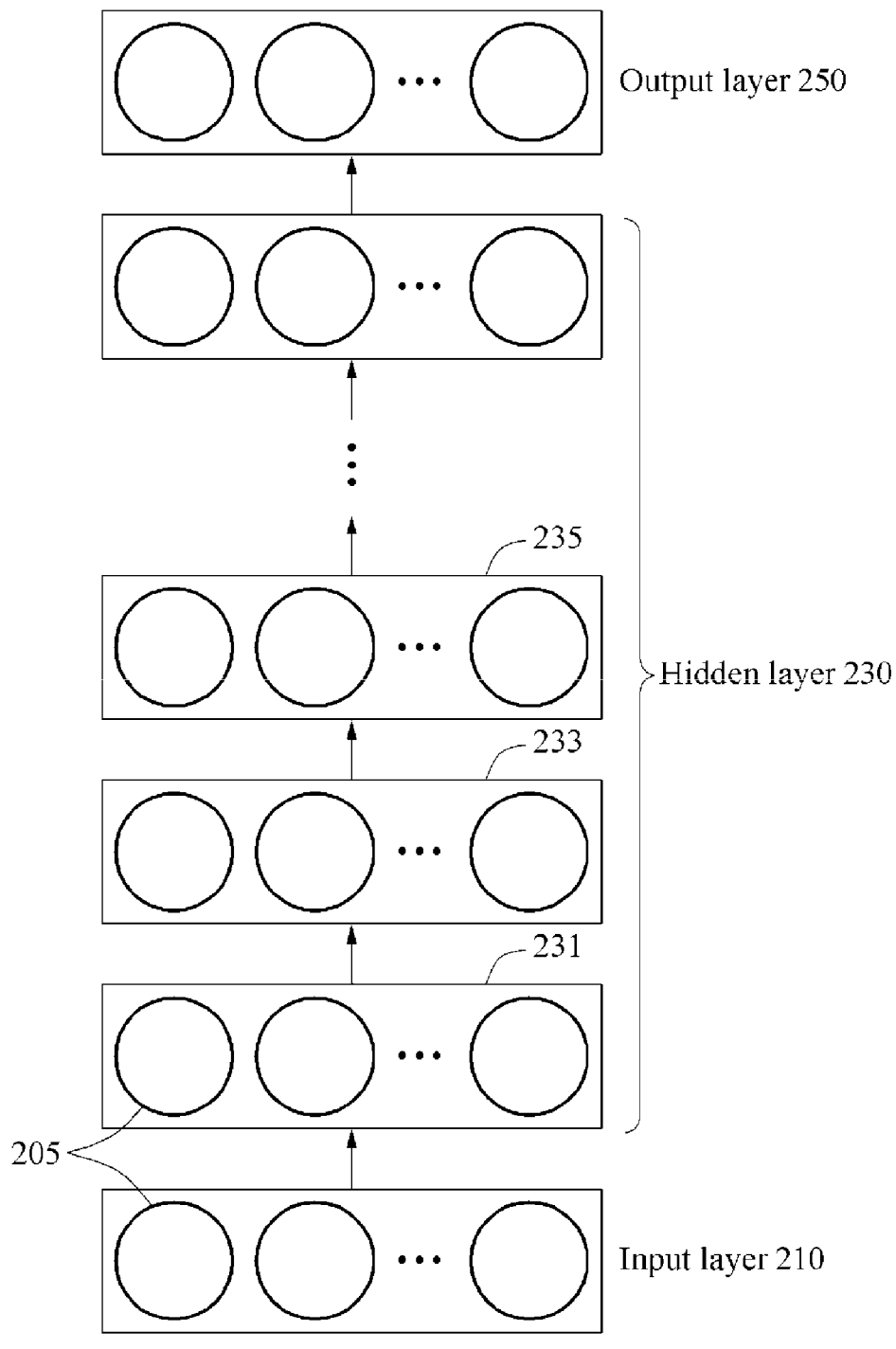
FIG. 2 is a diagram illustrating a structure of a neural network according to an exemplary embodiment.

FIG. 1 is a block diagram illustrating a configuration of a recognition apparatus 100 according to an exemplary embodiment. Referring to FIG. 1, the recognition apparatus 100 includes a memory 110 and a processor 130. The recognition apparatus 100 may recognize a user input using a neural network. The neural network may be, for example, an event-based deep neural network or a deep spiking neural network. An example of a structure of the neural network is shown in FIG. 2.

The neural network may include neurons activated based on first synaptic signals and second synaptic signals. A first synaptic signal may refer to a synaptic signal transmitted between two neighboring layers in the neural network. For example, the first synaptic signal may be transmitted from neurons included in a previous layer to a neuron included in a corresponding layer (hereinafter, referred to as a "current layer") or from neurons included in the current layer to neurons included in a next layer. The first synaptic signals may excite or inhibit neurons of the next layer based on a synaptic weight. A second synaptic signal may refer to a synaptic signal input from neurons other than a corresponding neuron in the same layer. The second synaptic signal may inhibit the other neurons. The second synaptic signal may inhibit neurons other than a neuron generating the second synaptic signal in the same group in the current layer, which will be further described below. The second synaptic signal may also be referred to as an "inhibition signal."

The neural network may have a structure, for example, a winner-take-all (WTA) structure, in which a neuron generating a second synaptic signal outputs a spike signal by inhibiting activation of neurons other than the neuron in the same group or in the same layer based on the second synaptic signal. An example of the WTA structure will be further described with reference to FIG. 5.

The neural network may include an input layer, a hidden layer and an output layer. The input layer may receive input data. The hidden layer may include a plurality of neurons activated based on first synaptic signals input from a previous layer and second synaptic signals input from a current layer. For example, an activation neuron activated based on the first synaptic signals and the second synaptic signals may generate an inhibition signal, and the inhibition signal may be transferred to neurons other than the activation neuron in the current layer based on a lateral inhibition coefficient of the activation neuron. The output layer may output a recognition result based on an output of the hidden layer.

The memory 110 may store a neural network that will be described with reference to FIGS. 2, 3, 4 and 5. The memory 110 may be, for example, a volatile memory or a nonvolatile memory. Depending on exemplary embodiments, the neural network may be stored in a remote storage, instead of the memory 110.

The processor 130 may generate a recognition result using the neural network stored in the memory 110. A program code executed by the processor 130 may be stored in the memory 110. The recognition apparatus 100 may be connected to an external device (for example, a PC or a network) via an input/output device, and may exchange data with the external device.

FIG. 2 is a diagram illustrating a structure of a neural network 200 according to an exemplary embodiment. Referring to FIG. 2, the neural network 200 includes a plurality of layers.

The neural network 200 may be, for example, a deep spiking neural network. The neural network 200 may include an input layer 210, a hidden layer 230 and an output layer 250. The input layer 210 may receive an input value of the neural network 200. The output layer 250 may output an output value of the neural network 200. The hidden layer 230 may be a layer hidden, that is, unseen from an outside of the neural network 200. The hidden layer 230 may include a plurality of layers, for example, layers 231, 233 and 235. Based on an arrangement order of the layers 231, 233 and 235, the layers 231, 233 and 235 may be referred to as a "previous layer," a "current layer" and a "next layer," respectively.

Each of the input layer 210, the hidden layer 230 and the output layer 250 may include neurons 205. The neurons 205 may be spiking neurons, for example, leaky integrate-and-fire (LIF) neurons.

Neurons of the current layer 233 may output a spike signal (for example, spike signals 310 and 330 of FIG. 3) in a predetermined condition based on first synaptic signals received from neurons of the previous layer 231. Also, the neurons of the current layer 233 may output spike signals based on second synaptic signals received from the other neurons in the current layer 233 in addition to the first synaptic signals. A neuron outputting a spike signal may be referred to as an "activation neuron."

An activation neuron may generate a first synaptic signal and a second synaptic signal. The activation neuron may be, for example, a neuron that outputs a spike signal when a membrane potential of the neuron exceeds a membrane potential threshold. The activation neuron may have an influence on a membrane potential of neurons in another layer through first synaptic signals, and may also have an influence on a membrane potential of neurons other than the activation neuron in the current layer through second synaptic signals.

A second synaptic signal may be transferred to the other neurons based on a lateral inhibition coefficient of the activation neuron. For example, a layer may include at least one group. In this example, a second synaptic signal generated by an activation neuron in a group may be transferred to the other neurons in the group. When the second synaptic signal is received to the other neurons, the other neurons may reduce a membrane potential based on a lateral inhibition coefficient and a membrane potential threshold of the other neurons. Lateral inhibition coefficients between the activation neuron and the other neurons may be set to be the same or different from each other. An operating method of a neuron and an activation neuron will be further described with reference to FIG. 3.

Figure 3:
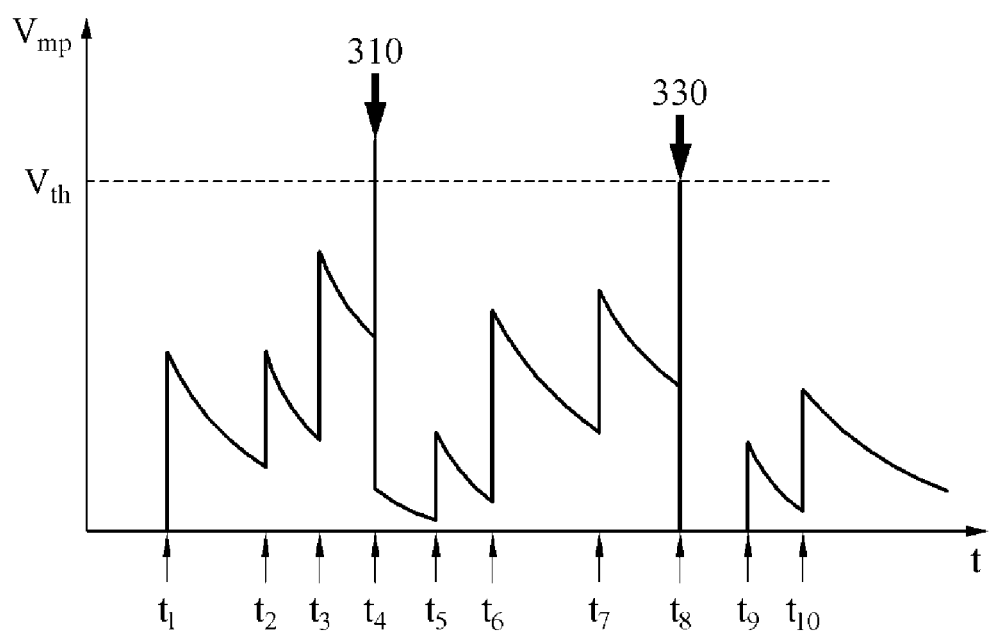
FIG. 3 is a graph illustrating an operating method of a neuron included in a neural network according to an exemplary embodiment.

FIG. 3 is a graph illustrating an operating method of a neuron included in a neural network according to an exemplary embodiment. FIG. 3 illustrates an example of an operation of a neuron included in the neural network. In the graph of FIG. 3, an X axis represents a time t at which first synaptic signals are input, and a Y axis represents a membrane potential of the neuron.

The neuron may receive first synaptic signals received from a previous layer to a current layer. The first synaptic signals may input over time. For example, the neuron may receive a first synaptic signal input at a time $t_1$. A membrane potential of the neuron receiving the first synaptic signal may have a predetermined value, and may be denoted by $V_{mp}$. The membrane potential of the neuron may change based on a weight (for example, denoted by $w_i$ in Equation 1) of synapses corresponding to the first synaptic signals. The weight of the synapses corresponding to the first synaptic signals may be understood as a weight of each of synapses in which the first synaptic signals are received.

For example, when a first synaptic signal does not exist, that is, when the first synaptic signal is not input, the membrane potential of the neuron may be reduced at a predetermined rate over time. The membrane potential of the neuron may be reduced at a rate of a membrane potential time constant (for example, denoted by $\tau_{mp}$ in Equation 1) of the neuron. Neurons may have different membrane potential time constant values, respectively.

The above-described operation of the neuron may be represented as shown in Equation 1 below.

$$V_{mp}(t_n) = V_{mp}(t_{n-1})e^{\frac{t_{n-1}-t_n}{\tau_{mp}}} + w_i^{(n)} \quad \text{[Equation 1]}$$

In Equation 1, $t_{n-1}$ denotes an input time at which a synaptic signal is previously input, $t_n$ denotes a current time at which a synaptic signal is input, and $w_i^{(n)}$ denotes an i-th synaptic weight at an n-th input time for a synaptic signal. Also, $V_{mp}$ denotes the membrane potential of the neuron, and $\tau_{mp}$ denotes the membrane potential time constant of the neuron.

In neurons receiving the same input, an exponential decay term $$e^{\frac{t_{n-1}-t_n}{\tau_{mp}}}$$

of Equation 1 may have the same value. For example, a membrane potential of neurons in the same group sharing a receptive field may be calculated based on the same exponential decay term. In other words, the exponential decay term may be calculated once, and may be applied without a change to calculate a membrane potential of another neuron. Thus, a calculation amount may be significantly reduced when a membrane potential of neurons is updated over time.

When a second synaptic signal is received, a membrane potential of a neuron may be reduced based on a lateral inhibition coefficient. A WTA structure based on a lateral inhibition coefficient will be described with reference to FIG. 4.

For example, first synaptic signals are input at times $t_2$, $t_3$ and $t_4$ over time. In this example, when the membrane potential of the neuron exceeds a membrane potential threshold, for example, $V_{th}$ of the neuron at the time $t_4$, the neuron may output the spike signal 310.

When the spike signal 310 is output, the membrane potential of the neuron, that is, an activation neuron may be reduced based on a predetermined scheme. The scheme may include, for example, a scheme of reducing the membrane potential of the activation neuron by a value that is in proportion to the membrane potential threshold of the activation neuron, and a scheme of reducing the membrane potential of the activation neuron by a preset rate that is in proportion to the membrane potential threshold of the activation neuron.

The membrane potential of the activation neuron may be reduced as shown in Equation 2 below.

$$V_{mp}(t_n^+) = V_{mp}(t_n) - \gamma V_{th} \quad \text{with an output spike if } V_{mp}(t_n) \geq V_{th} \quad \text{[Equation 2]}$$

In Equation 2, $V_{mp}(t_n^+)$ denotes a membrane potential of a neuron after a time $t_n^+$ at which a spike signal is output. Also, $V_{th}$ denotes a membrane potential threshold of the neuron, and γ denotes a membrane potential reset factor. The membrane potential reset factor γ may have, for example, a value between "0" and "1."

The membrane potential of the neuron reduced based on the scheme may exceed the membrane potential threshold $V_{th}$ again by first synaptic signals input at times $t_5$, $t_6$, $t_7$ and $t_8$. The neuron may output the spike signal 330 at the time $t_8$.

The membrane potential of the neuron may be clamped based on a range (for example, $-V_{th} < V_{mp} < V_{th}$) set based on the membrane potential threshold of neurons.

For example, a membrane potential time constant value of a neuron may be changed based on a result of a comparison between a magnitude of input signals input to the neural network and a preset reference value.

In an example, when the magnitude of the input signals is less than a preset first reference value, a recognition apparatus may increase a membrane potential time constant value of neurons in the neural network. When the membrane potential time constant value of the neurons increases, a membrane potential of the neurons may gradually decrease. Thus, it is possible to control voltage of the neurons to be efficiently integrated.

In another example, when the magnitude of the input signals is greater than a preset second reference value, the recognition apparatus may reduce a membrane potential time constant value of neurons included in a first hidden layer. When the membrane potential time constant value of the neurons in the first hidden layer is reduced, a membrane potential of the neurons in the first hidden layer may quickly decrease. Thus, the first hidden layer may be used as a filtering layer. For example, the input signals may be filtered in the first hidden layer. The second reference value may be greater than the first reference value.

Figure 4:
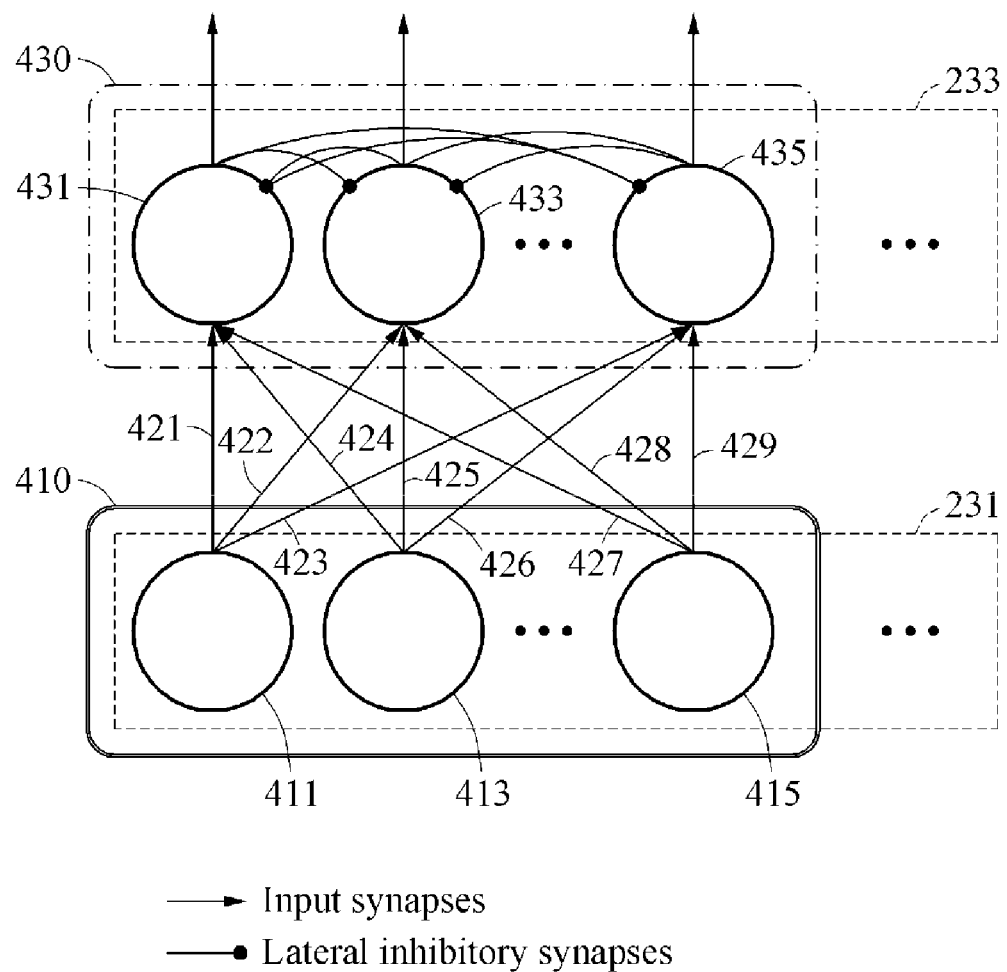
FIG. 4 is a diagram illustrating a winner-take-all (WTA) structure including synapses and neurons in a neural network according to an exemplary embodiment.

FIG. 4 is a diagram illustrating a WTA structure including synapses and neurons in a neural network according to an exemplary embodiment. FIG. 4 illustrates the previous layer 231 and the current layer 233 in the neural network 200 of FIG. 2.

The current layer 233 may include at least one group, for example, a group 430 including a portion of neurons included in the current layer 233.

Neurons 431, 433 and 435 included in the group 430 may share a receptive field 410 belonging to the previous layer 231. The receptive field 410 may be understood as a set of neurons that provide synaptic signals to the neurons 431, 433 and 435 in the group 430 among a plurality of neurons included in the previous layer 231.

Each of neurons 411, 413 and 415 included in the receptive field 410 may be connected to all the neurons 431, 433 and 435 included in the group 430 corresponding to the receptive field 410 via input synapses 421, 422, 423, 424, 425, 426, 427, 428 and 429. For example, the neuron 411 may be connected to the neurons 431, 433 and 435 via the synapses 421, 422 and 423. The neuron 413 may be connected to the neurons 431, 433 and 435 via the synapses 424, 425 and 426. Also, the neuron 415 may be connected to the neurons 431, 433 and 435 via the synapses 427, 428 and 429.

The neurons 431, 433 and 435 may receive first synaptic signals from the neurons 411, 413 and 415 via the synapses 421 through 429.

An activation neuron among the neurons 431, 433 and 435 in the same group, that is, the group 430 may generate a second synaptic signal to inhibit the other neurons in the current layer 233 or in the group 430. For example, when the neuron 431 is an activation neuron, the neuron 431 may generate a second synaptic signal to inhibit the neurons 433 and 435 via lateral inhibitory synapses. When the neuron 433 is an activation neuron, the neuron 433 may generate a second synaptic signal to inhibit the neurons 431 and 435 via the lateral inhibitory synapses. When the neuron 435 is an activation neuron, the neuron 435 may generate a second synaptic signal to inhibit the neurons 431 and 433 via the lateral inhibitory synapses.

The activation neuron may adjust a membrane potential of the other neurons in the group 430, based on the second synaptic signal.

Figure 5:
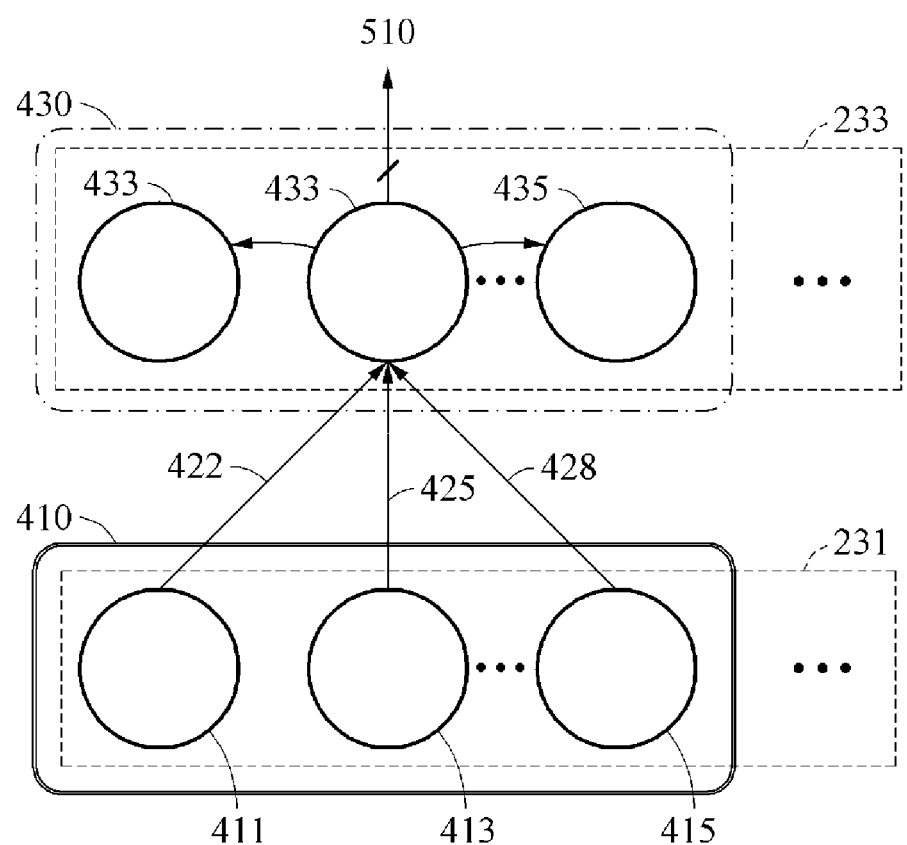
FIG. 5 is a diagram illustrating an operation based on an activation neuron in a WTA structure including synapses and neurons according to an exemplary embodiment.

FIG. 5 is a diagram illustrating an operation based on an activation neuron in a WTA structure including synapses and neurons according to an exemplary embodiment. Hereinafter, for convenience of description, an operation between neurons and synapses based on the neuron 433 assumed as an activation neuron is described.

For example, the neuron 433 among the neurons 431, 433 and 435 included in the same group, for example, the group 430 may receive first synaptic signals corresponding to the synapses 422, 425 and 428 from the neurons 411, 413 and 415 included in the receptive field 410. When a membrane potential of the neuron 433 exceeds a membrane potential threshold of the neuron 433 by the first synaptic signals, the neuron 433 may be an activation neuron. The neuron 433 may output a spike signal 510. The spike signal 510 may be transferred to a plurality of neurons of a next layer.

Also, the neuron 433 may generate a second synaptic signal to inhibit the other neurons, that is, neurons 431 and 435 in the group 430. The second synaptic signal may be transferred to the neurons 431 and 435 based on, for example, a lateral inhibition coefficient of the neuron 433.

When the second synaptic signal is received from the neuron 433, the neurons 431 and 435 may reduce a membrane potential of the neurons 431 and 435 based on a membrane potential threshold of the neurons 431 and 435 and the lateral inhibition coefficient of the neuron 433.

In response to the second synaptic signal being received, the neurons 431 and 435 may reduce the membrane potential of the neurons 431 and 435 by an amount that is in proportion to the membrane potential threshold of the neurons 431 and 435 and the lateral inhibition coefficient of the neuron 433, as shown in Equation 3 below.

$$V_{mp} = V_{mp} - \mu V_{th} \quad \text{[Equation 3]}$$

$V_{mp}$ denotes a membrane potential of a neuron, μ denotes a lateral inhibition coefficient of a neuron, for example, an activation neuron, and $V_{th}$ denotes a membrane potential threshold.

Because the neurons 431 and 435 are inhibited by the second synaptic signal, the neuron 433 may have a WTA structure. In the WTA structure, lateral inhibition coefficients between an activation neuron and the other neurons may be set to be the same value or different values.

A value of a lateral inhibition coefficient may be determined based on a weight of synapses corresponding to each of neurons. The value of the lateral inhibition coefficient may be set as a fixed value between "0" and "1," or may be optimized through learning, depending on exemplary embodiments.

Figure 6:
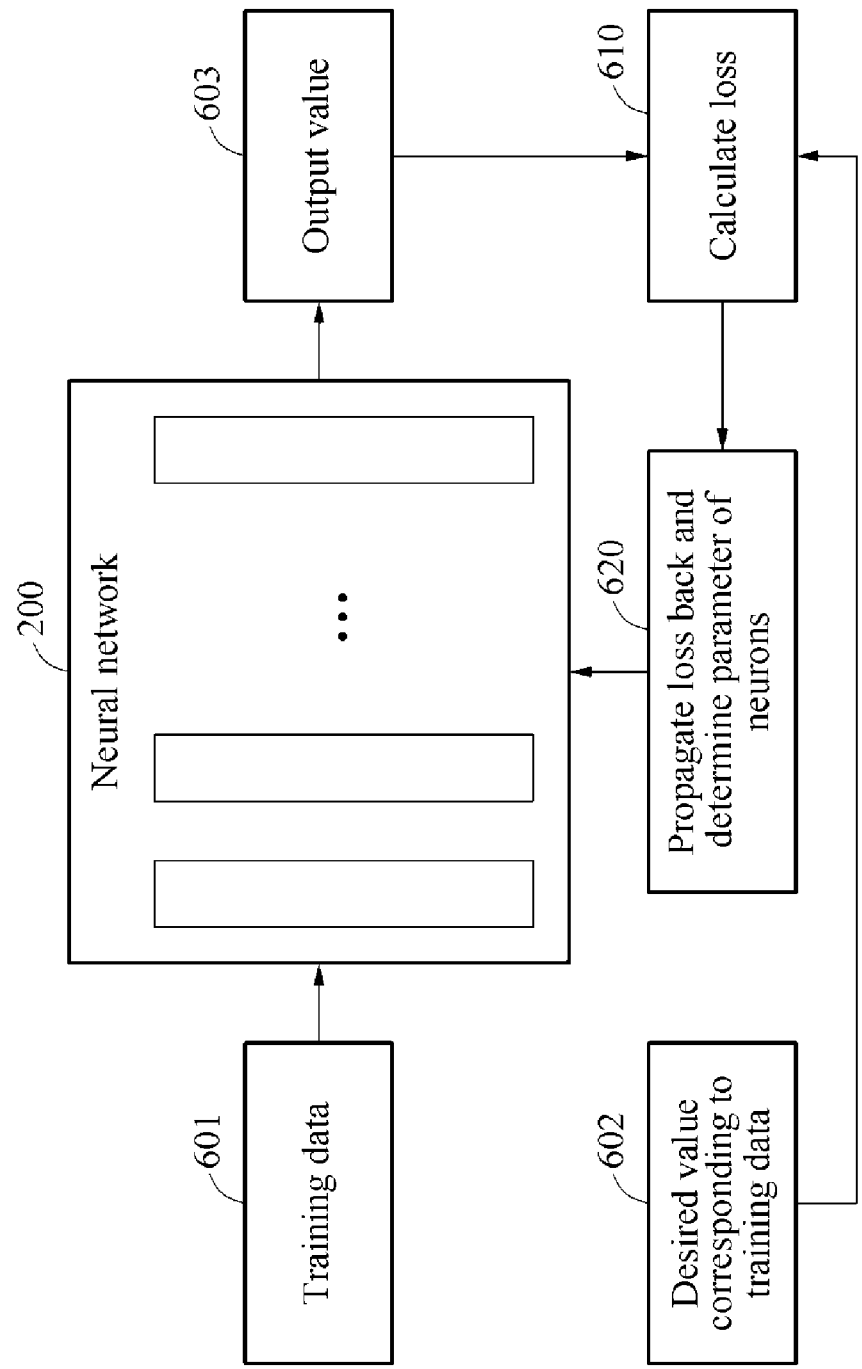
FIG. 6 is a diagram illustrating a process of performing a training method according to an exemplary embodiment.

FIG. 6 is a diagram illustrating a process of performing a training method according to an exemplary embodiment. FIG. 6 illustrates a training process performed in the neural network 200 of FIG. 2.

When training data 601 is applied to an input layer of the neural network 200, the neural network 200 outputs an output value 603 corresponding to the training data 601. The training data 601 may be an input value applied to the neural network 200 for training, and may correspond to data known in advance, for example, a label or a desired value corresponding to the training data 601.

According to an exemplary embodiment, because a supervised learning method is used, a desired value 602 corresponding to the training data 601 is known in advance when the training data 601 is applied to the input layer.

In operation 610, a training apparatus calculates a loss by a difference between the output value 603 and the desired value 602 corresponding to the training data 601. In operation 620, the training apparatus propagates the loss calculated in operation 610 back to the neural network 200, and determines a parameter of neurons included in the neural network 200.

The training apparatus may apply next training data to the neural network 200 to which the parameter determined in operation 620 is applied. The training apparatus may recalculate a loss by comparing a new output value to a desired value corresponding to the next training data. The training apparatus may propagate the recalculated loss back to the neural network 200, and may regulate the parameter of the neurons. To optimize a parameter of the neural network 200, the training apparatus may perform a process of operations 610 and 620 iteratively a plurality of times on all training data.

The parameter determined in operation 620 or the optimized parameter may be applied to a neural network of the recognition apparatus described with reference to FIGS. 1 through 5.

For example, a membrane potential time constant of a neuron may be trained. The training apparatus may change a membrane potential time constant value of a neuron included in the neural network 200 based on a result of a comparison between magnitude of input signals (for example, the training data 601) input to the neural network 200 and a preset reference value.

The training apparatus may normalize a backpropagation error occurring when the loss calculated in operation 610 is propagated back to the neural network 200.

For example, the training apparatus may normalize the backpropagation error so that an update value of synaptic weights of neurons in all layers may be maximally the same as an update value of a membrane potential threshold of the neurons in all layers. Through the normalization of the backpropagation error, an update imbalance between the layers may be adjusted.

The update value of the synaptic weights of the neurons and the update value of the membrane potential threshold of the neurons may be obtained based on Equations 4 and 5 below, respectively.

$$\frac{E\left[\sum_{i,j}^{n,m} \Delta w_{ij}^2\right]}{E\left[\sum_{i,j}^{N,M} w_{ij}^2\right]} \qquad \text{[Equation 4]}$$

In Equation 4, $w_{ij}$ denotes a weight of a synapse input from a neuron j to a neuron i. $\Delta w_{ij}$ denotes an update value of weights. N denotes a number of neurons included in a layer, and M denotes a number of synapses per neuron. Also, n denotes a number of activation neurons included in a layer, and m denotes a number of active synapses of neurons. The active synapses may refer to synapses contributed to a change in a membrane potential by receiving a signal from another neuron.

$$\frac{E\left[\sum_{i}^{n} \Delta V_{th,i}^2\right]}{E\left[\sum_{i}^{N} V_{th,i}^2\right]} \qquad \text{[Equation 5]}$$

In Equation 5, $V_{th,i}$ denotes a membrane potential threshold of an i-th neuron. Also, $\Delta V_{th,i}$ denotes an update value of a membrane potential threshold.

Figure 7:
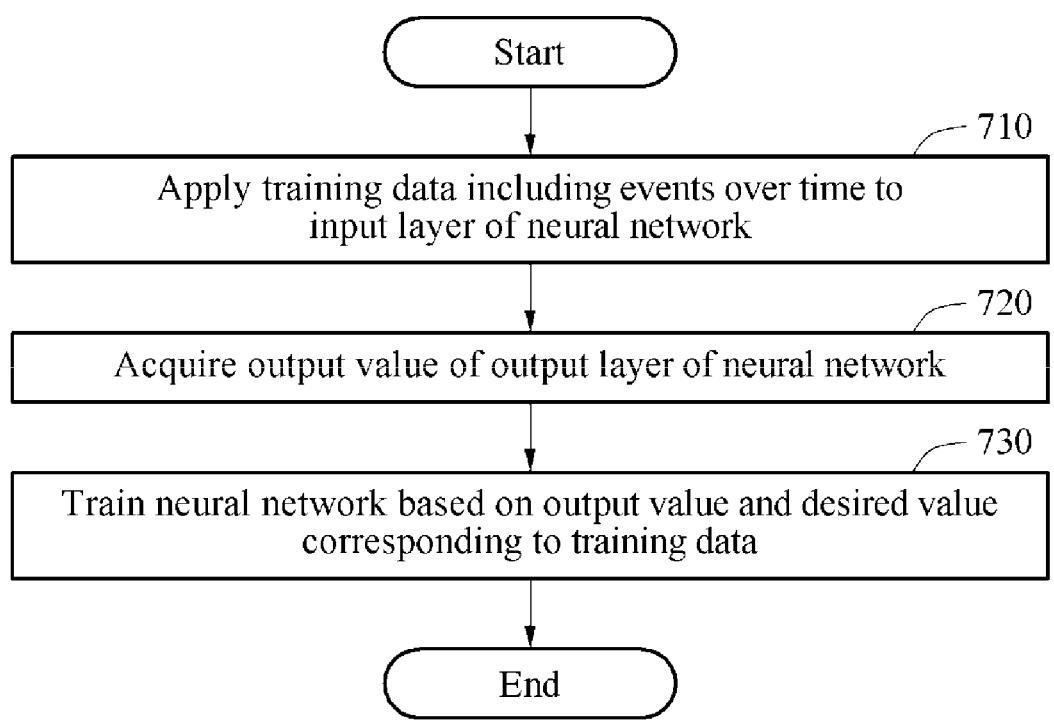
FIG. 7 is a flowchart illustrating a training method according to an exemplary embodiment.

FIG. 7 is a flowchart illustrating a training method according to an exemplary embodiment. Referring to FIG. 7, in operation 710, a training apparatus according to an exemplary embodiment applies training data to an input layer of a neural network. The training data includes events over time.

The neural network may include neurons activated based on input synaptic signals input from a previous layer and a lateral inhibition signal input from a current layer. An activation neuron among the neurons may excite or inhibit neurons of a next layer, and may inhibit neurons other than the activation neuron in the current layer.

In operation 720, the training apparatus acquires an output value of an output layer of the neural network. For example, when the training data applied to the input layer passes through layers of the neural network, the training apparatus may acquire the output value from the output layer. A parameter of the layers of the neural network may be initially set to a default value or may be set.

In operation 730, the training apparatus trains the neural network based on the output value and a desired value corresponding to the training data. For example, the training apparatus may determine a parameter of neurons included in the neural network, to train the neural network. The parameter of the neurons may include, for example, a membrane potential threshold of a neuron, input synaptic weights of a neuron, output synaptic weights of a neuron, or a lateral inhibition coefficient of a neuron. A scheme of training the neural network using the training apparatus will be further described with reference to FIG. 8.

Figure 8:
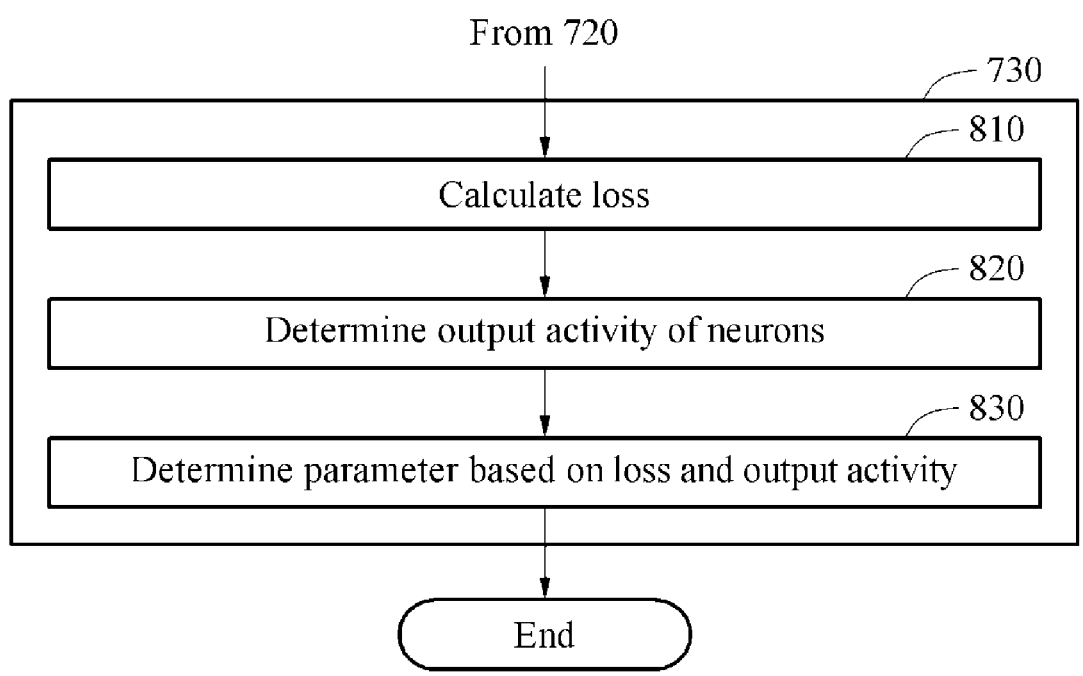
FIG. 8 is a flowchart illustrating a scheme of training a neural network in the training method of FIG. 7.

FIG. 8 is a flowchart illustrating operation 730 of FIG. 7. Referring to FIG. 8, in operation 810, the training apparatus calculates a loss by a difference between the output value and the desired value corresponding to the training data.

In operation 820, the training apparatus determines an output activity of neurons. For example, the training apparatus may use a membrane potential equilibrium equation to determine the output activity of the neurons. The training apparatus may determine the output activity of the neurons using the membrane potential equilibrium equation, based on the following schemes:

1. Example in which a Lateral Inhibition Coefficient of a Neuron has a Value of "0"

The training apparatus may determine an output activity a of a neuron included in a neural network based on, for example, input activities of the neuron, a membrane potential reset factor of the neuron and a membrane potential threshold of the neuron, as shown in Equation 6 below. The output activity a of the neuron may be understood as an output value of the neuron.

$$s - \gamma V_{th} a \approx 0 \rightarrow a \approx \frac{s}{\gamma V_{th}} \quad \text{[Equation 6]}$$

In Equation 6, $s=\Sigma w_k x_k$ may be satisfied, $x_k$ denotes an input activity input to a k-th synapse, and $w_k$ denotes a k-th synaptic weight. Also, $\gamma$ denotes a membrane potential reset factor of a neuron, and $V_{th}$ denotes a membrane potential threshold of the neuron.

2. Example in which Lateral Inhibition Coefficients of Neurons are the Same in a Group of a WTA Circuit The training apparatus may adjust an output activity $a_i$ of an i-th neuron based on, for example, a membrane potential reset factor of a neuron, a lateral inhibition coefficient of the neuron, a lateral discount factor of the neuron, and output activities of the other neurons in the group, as shown in Equation 7 below.

$$s_i - \gamma V_{th,i} a_i - \mu \sigma V_{th,i} \sum_{j \neq i}^{n} a_j \approx 0 \rightarrow a_i \approx \frac{s_i}{\gamma V_{th,i}} - \frac{\mu \sigma}{\gamma} \sum_{j \neq i}^{n} a_j \quad \text{[Equation 7]}$$

In Equation 7, $s_i = \Sigma w_{k_i} x_{k_i}$ may be satisfied, $x_{k_i}$ denotes an input activity input to a k-th input synapse of the i-th neuron, and $w_{k_i}$ denotes a synaptic weight of the k-th input synapse of the i-th neuron. $V_{th,i}$ denotes a membrane potential threshold of the i-th neuron, $a_i$ denotes the output activity of the i-th neuron, and $a_j$ denotes an output activity of a j-th neuron. Also, $\mu$ denotes a lateral inhibition coefficient, and $\sigma$ denotes a lateral discount factor.

3. Example in which Lateral Inhibition Coefficients of Neurons are Different from Each Other in a Group of a WTA Circuit The training apparatus may adjust an output activity $a_i$ of an i-th neuron based on, for example, a membrane potential reset factor of a neuron, a lateral inhibition coefficient of the neuron, a lateral discount factor of the neuron, and output activities of the other neurons in the group, as shown in Equation 8 below.

$$s_i - \gamma V_{th,i} a_i + \kappa_{ii} V_{th,i} a_i + \sigma V_{th,i} \sum_{j \neq i}^{n} \kappa_{ij} a_j \approx 0 \rightarrow \quad \text{[Equation 8]}$$

$$a_i \approx \frac{s_i}{(\gamma - \kappa_{ii}) V_{th,i}} + \frac{\sigma \sum_{j \neq i}^{n} \kappa_{ij} a_j}{(\gamma - \kappa_{ii})}$$

In Equation 8, $k_{ij}$ denotes a value of a lateral inhibition input from a j-th neuron to the i-th neuron.

4. Example in which a Value of a Lateral Inhibition Coefficient of a Neuron is Determined Based on Input Synaptic Weights of the Neuron For example, the training apparatus may adjust an output activity of a neuron, as shown in Equation 9 below.

$$s_i - \gamma V_{th,i} a_i - \sigma V_{th,i} \sum_{j \neq i}^{n} G_{ij}^{+} a_j \approx 0 \rightarrow \quad \text{[Equation 9]}$$

-continued $$a_i \approx \frac{s_i}{\gamma V_{th,i}} - \frac{\sigma}{\gamma} \sum_{j \neq i}^{n} G_{ij}^{+} a_j$$

Equation 9 may satisfy $$G_{ij}^{+} = \mu \frac{\langle \max(0, w_i), \max(0, w_j) \rangle}{\langle \max(0, w_j), \max(0, w_j) \rangle}$$

or $$G^{+} = \mu \begin{bmatrix} \frac{1}{|\max(0, w_1)|^2} & \cdots & 0 \\ \vdots & \ddots & \vdots \\ 0 & \cdots & \frac{1}{|\max(0, w_N)|^2} \end{bmatrix} ww^T.$$

In Equation 9, $G^+$ denotes a matrix including an element $G_{ij}^+$ at (i, j), and $w=[w_1, \ldots, w_N]$. Also, $w_1$ denotes a first synaptic weight, and $w_N$ denotes an N-th synaptic weight.

In operation 830, the training apparatus determines a parameter of the neurons based on the loss calculated in operation 810 and the output activity determined in operation 820. For example, the training apparatus may determine a parameter of neurons included in the neural network using a loss propagated back to the neural network and a gradient descent scheme that is based on an output activity of the neurons.

The parameter may include, for example, a membrane potential threshold of a neuron, input synaptic weights of the neuron, output synaptic weights of the neuron, or a lateral inhibition coefficient of the neuron. For example, the training apparatus may induce partial differential terms for parameters, for example, $$\frac{\partial a_i}{\partial s_i}, \frac{\partial a_i}{\partial x_k}, \frac{\partial a_i}{\partial w_{ik}}, \frac{\partial a_i}{\partial V_{th,i}}, \frac{\partial a_i}{\partial \kappa_{ih}}$$

from a membrane potential equilibrium equation. The training apparatus may regulate the parameters using the partial differential terms.

A scheme of determining a parameter of neurons in the training apparatus will be further described with reference to FIG. 9.

Figure 9:
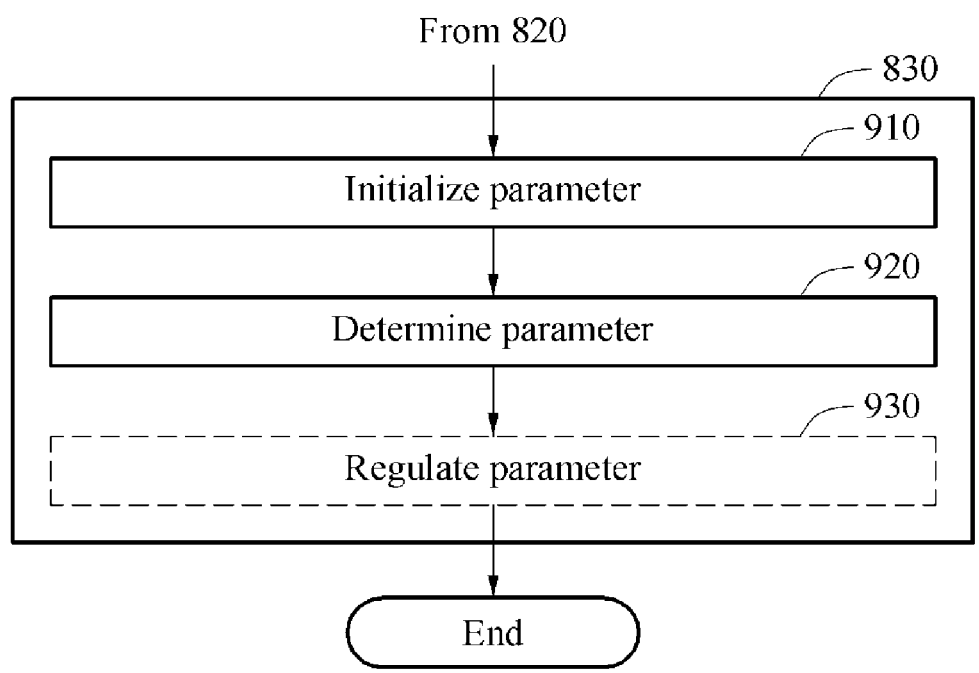
FIG. 9 is a flowchart illustrating a scheme of determining a parameter in the scheme of FIG. 8.

FIG. 9 is a flowchart illustrating operation 830 of FIG. 8. Referring to FIG. 9, in operation 910, the training apparatus initializes a parameter of the neural network. For example, the training apparatus may initialize at least one among a membrane potential threshold and synaptic weights of neurons included in a layer of the neural network.

The training apparatus may initialize synaptic weights w of neurons for each of layers included in the neural network based on a number M of synapses corresponding to each of the neurons included in the layer, as shown in Equation 10 below.

$$w \sim \text{Uniform}\left[-\sqrt{\frac{3}{M}}, \sqrt{\frac{3}{M}}\right] \quad \text{[Equation 10]}$$

Also, the training apparatus may initialize a membrane potential threshold $V_{th}$ of neurons for each of layers included in the neural network based on the number M of the synapses corresponding to each of the neurons included in the layer, as shown in Equation 11 below.

$$V_{th} = \alpha \sqrt{\frac{3}{M}}, \alpha > 1 \quad \text{[Equation 11]}$$

In Equation 11, α denotes an initialization coefficient.

In operation 920, the training apparatus determines the parameter. The training apparatus may determine the synaptic weights and the membrane potential threshold of the neurons included in the layer using the loss calculated in operation 810 and propagated back to the neural network and a gradient descent scheme that is based on the output activity determined in operation 820.

In operation 930, the training apparatus may regulate the parameter. For example, the training apparatus may regulate the input synaptic weights or the membrane potential threshold of the neurons. The training apparatus may selectively perform a process of regulating a parameter.

A scheme of regulating the input synaptic weights in the training apparatus, and a scheme of regulating the membrane potential threshold of the neurons in the training apparatus will be further described with reference to FIGS. 10 and 11, respectively.

Figure 10:
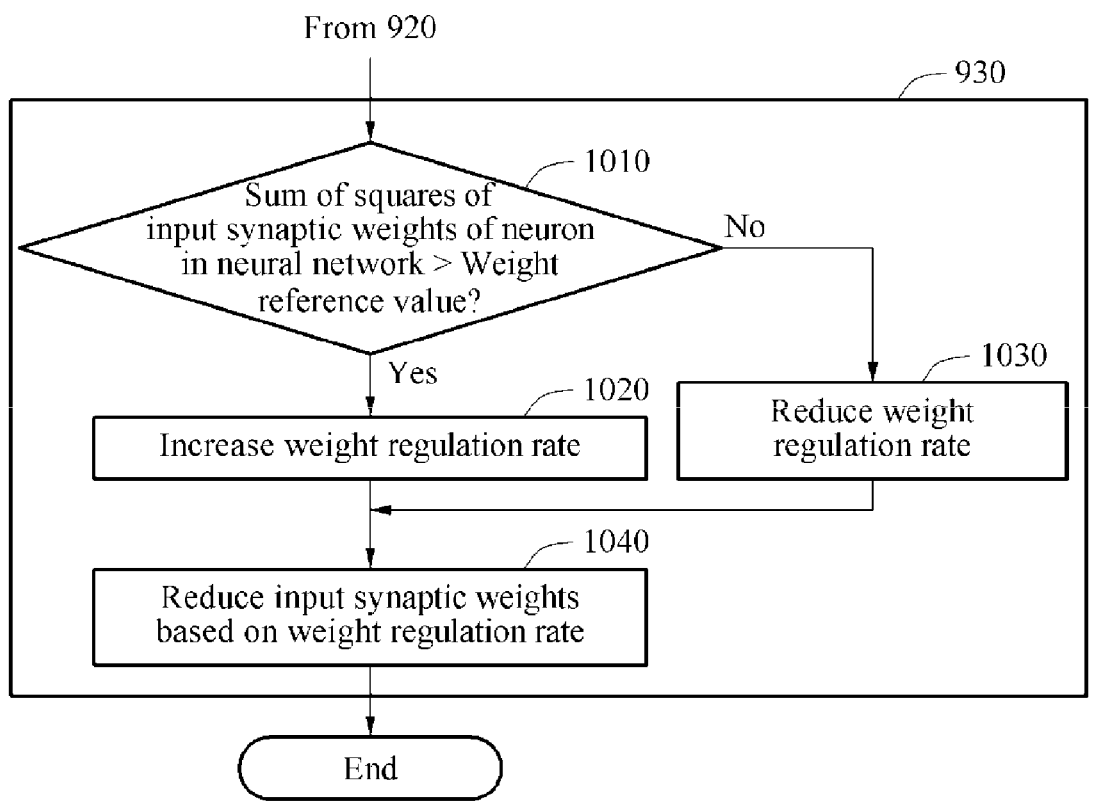
FIG. 10 is a flowchart illustrating a scheme of regulating an input synaptic weight in the scheme of FIG. 9.

FIG. 10 is a flowchart illustrating a scheme of regulating the input synaptic weights in operation 930 of FIG. 9. Referring to FIG. 10, the training apparatus may regulate an input synaptic weight to continue to decrease during training.

In operation 1010, the training apparatus compares a sum of squares of input synaptic weights of a neuron included in the neural network to a weight reference value. The weight reference value may be set in advance to "1."

The training apparatus may determine a weight regulation rate based on a comparison result of operation 1010. When the sum of the squares is greater than the weight reference value, the training apparatus increases the weight regulation rate in operation 1020. When the sum of the squares is less than or equal to the weight reference value, the training apparatus reduces the weight regulation rate in operation 1030. In operation 1040, the training apparatus reduces the input synaptic weights based on the weight regulation rate increased in operation 1020 or reduced in operation 1030.

The training apparatus may maintain a sum of squares of input synaptic weights of each of neurons to be close to the weight reference value by increasing the weight reference value in response to the sum of the squares being greater than the weight reference value and by reducing the weight regulation rate in response to the sum of the squares being less than or equal to the weight reference value.

The scheme of regulating the input synaptic weights in FIG. 10 may be represented as shown in Equation 12 below.

$$L_w(l, i) = \beta e^{\lambda \left( \sum_j \left(w_{ij}^{(l)}\right)^2 - 1 \right)}, \quad \text{[Equation 12]}$$

where $\Sigma_j (w_{ij}^{(l)})^2 \approx 1$ for neuron $i$ of layer $l$

In Equation 12, $L_w(l,i)$ denotes an objective function or a loss function for weight regularization.

Also, $\Sigma_j(w_{ij}^{(l)})^2$ denotes a sum of squares of input synaptic weights of a neuron, and may have a value close to "1" for a neuron i of a layer l. λ and β denote parameters to regulate a weight for weight regularization in the entire objective function. Equation 12 may be represented as shown in Equation 13 below.

$$\frac{\partial L_w(l)}{\partial w_{ij}^{(l)}} = 2\beta\lambda w_{ij}^{(l)} e^{\lambda} \left( \Sigma \left(w_{ij}^{(l)}\right)^2 - 1 \right)$$

Equation 13 may represent a result obtained by differentiating Equation 12.

FIG. 11 is a flowchart illustrating a scheme of regulating a membrane potential threshold in operation 930 of FIG. 9. Referring to FIG. 11, the training apparatus may regulate a membrane potential threshold of neurons included in the neural network based on whether the neurons are activated.

In operation 1110, the training apparatus determines whether at least one activation neuron is included in the neural network. When the at least one activation neuron is determined not to be included in the neural network in operation 1110, the training apparatus may determine whether the membrane potential threshold of the neurons is less than a preset membrane potential reference value in operation 1140.

When the at least one activation neuron is determined to be included in the neural network in operation 1110, the training apparatus increases a membrane potential threshold of the at least one activation neuron at a predetermined rate (for example, ρ) in operation 1120.

In operation 1130, the training apparatus reduces a membrane potential threshold of all the neurons in the neural network. For example, the training apparatus may reduce the membrane potential threshold of the neurons by ρNw/N based on a number N of neurons sharing a receptive field belonging to a previous layer and a number Nw of activation neurons included in the same layer.

The training apparatus may reduce the membrane potential threshold of the neurons by a predetermined value when the activation neuron is fired, that is, when a spike signal is output, to provide a fair chance for optimization to all the neurons in the neural network.

In operation 1140, the training apparatus compares the membrane potential threshold of the neurons to the membrane potential reference value. When the membrane potential threshold is determined to be greater than or equal to the membrane potential reference value in operation 1140, the training apparatus terminates an operation.

When the membrane potential threshold is determined to be less than the membrane potential reference value in operation 1140, the training apparatus increases a synaptic weight corresponding to each of the neurons in operation 1150. For example, when the membrane potential threshold is less than the membrane potential reference value, the training apparatus may increase a synaptic weight corresponding to each of the neurons, instead of reducing the membrane potential threshold. Thus, it is possible to prevent the neurons from being unstable due to an extremely low membrane potential threshold.

The elements or components described herein may be implemented using hardware components, software components, or a combination thereof. For example, a processing device may be implemented using one or more general-purpose or special purpose computers, such as, for example, a processor, a controller and an arithmetic logic unit (ALU), a digital signal processor (DSP), a microcomputer, a field programmable array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described exemplary embodiments may be recorded in non-transitory computer-readable media including program instructions to implement various operations that may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules to perform the operations of the above-described exemplary embodiments, or vice versa.

While this disclosure includes examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A recognition apparatus comprising:
    a memory configured to store a neural network comprising a previous layer of neurons, and a current layer of neurons that are activated based on first synaptic signals and second synaptic signals, the first synaptic signals being input from the previous layer, and the second synaptic signals being input from the current layer; and
    a processor configured to:
        generate a recognition result based on the neural network; and
        change a membrane potential time constant value of neurons included in the neural network based on a result of a comparison between a magnitude of input signals that are input to the neural network and a reference value,
    wherein an activation neuron among the neurons of the current layer generates a first synaptic signal to excite or inhibit neurons of a next layer, and generates a second synaptic signal to inhibit neurons other than the activation neuron in the current layer.

2. The recognition apparatus of claim 1, wherein the neurons of the current layer comprise spiking neurons.

3. The recognition apparatus of claim 1, wherein the activation neuron adjusts a membrane potential of the other neurons based on the first synaptic signals and the second synaptic signals.

4. The recognition apparatus of claim 1, wherein the activation neuron transmits the second synaptic signal to the other neurons based on a lateral inhibition coefficient of the activation neuron.

5. The recognition apparatus of claim 4, wherein a neuron receiving the second synaptic signal among the other neurons decreases a membrane potential of the neuron based on a membrane potential threshold of the neuron and the lateral inhibition coefficient.

6. The recognition apparatus of claim 1, wherein the previous layer comprises a group of neurons, and
    the neurons included in the group share a receptive field.

7. The recognition apparatus of claim 6, wherein the current layer comprises another group of neurons, the other group corresponding to the receptive field, and
    each of the neurons sharing the receptive field is connected to all of the neurons included in the other group corresponding to the receptive field.

8. The recognition apparatus of claim 6, wherein the processor is further configured to:
    determine an exponential decay term for the neurons included in the group; and
    determine a membrane potential of each of the neurons included in the group, based on the exponential decay term.

9. The recognition apparatus of claim 1, wherein a membrane potential of the neurons of the current layer is within a range based on a membrane potential threshold of the neurons of the current layer.

10. The recognition apparatus of claim 1, wherein the processor is further configured to increase the membrane potential time constant value of the neurons included in the neural network in response to the magnitude of the input signals being less than a first reference value.

11. The recognition apparatus of claim 1, wherein the processor is further configured to decrease a membrane potential time constant value of neurons included in a first layer among previous layers of neurons in response to the magnitude of the input signals being greater than a second reference value.

12. The recognition apparatus of claim 1, wherein the first synaptic signals are input over time, and
wherein a membrane potential of the neurons of the current layer changes based on a weight of synapses corresponding to the first synaptic signals.

13. The recognition apparatus of claim 1, wherein in response to the first synaptic signals not being input, a membrane potential of the neurons of the current layer is decreased at a rate over time.

14. The recognition apparatus of claim 1, wherein the activation neuron outputs a spike signal in response to a membrane potential of the activation neuron exceeding a membrane potential threshold of the activation neuron, and
the membrane potential of the activation neuron is decreased in response to the spike signal being output.

15. The recognition apparatus of claim 14, wherein the membrane potential of the activation neuron is decreased by a value proportional to the membrane potential threshold of the activation neuron, or
the membrane potential of the activation neuron is decreased by a rate proportional to the membrane potential threshold of the activation neuron.

16. The recognition apparatus of claim 1, wherein a value of a lateral inhibition coefficient of the activation neuron is determined based on a weight of synapses corresponding to each of the neurons of the current layer.

17. A training method comprising:
applying training data to an input layer of a neural network, the training data comprising events over time;
acquiring an output value of an output layer of the neural network;
training the neural network based on the output value and a desired value corresponding to the training data,
wherein the training comprises changing a membrane potential time constant value of neurons included in the neural network based on a result of a comparison between a magnitude of input signals that are input to the neural network and a reference value.

18. The training method of claim 17, wherein the neural network comprises a previous layer of neurons, and a current layer of neurons that are activated based on input synaptic signals that are input from the previous layer and a lateral inhibition signal that are input from a current layer, and
an activation neuron among the neurons of the current layer excites or inhibits neurons of a next layer, and inhibits neurons other than the activation neuron in the current layer.

19. The training method of claim 17, wherein the training comprises:
determining an output activity of a neuron included in the neural network based on input activities of the neuron, a membrane potential reset factor of the neuron, and a membrane potential threshold of the neuron; and
determining a parameter of neurons included in the neural network based on the output activity of the neuron included in the neural network.

20. The training method of claim 19, wherein the parameter comprises at least one among the membrane potential threshold of the neuron, input synaptic weights of the neuron, output synaptic weights of the neuron, and a lateral inhibition coefficient of the neuron.

21. The training method of claim 20, wherein the training further comprises adjusting the output activity of the neuron based on the membrane potential reset factor of the neuron, the lateral inhibition coefficient of the neuron, a lateral discount factor of the neuron, and output activities of neurons other than the neuron in a group of neurons.

22. The training method of claim 21, wherein the lateral inhibition coefficient of the neuron is determined based on the input synaptic weights of the neuron.

23. The training method of claim 17, wherein the changing comprises increasing the membrane potential time constant value of the neurons in response to the magnitude of the input signals being less than a first reference value.

24. The training method of claim 17, wherein the changing comprises decreasing a membrane potential time constant value of neurons included in a first layer among previous layers of neurons in response to the magnitude of the input signals being greater than a second reference value.

25. The training method of claim 17, wherein the training comprises:
determining a loss that is propagated back to the neural network, based on the desired value and the output value; and
determining a parameter of neurons included in the neural network based on the loss and a gradient descent scheme that is based on an output activity of the neurons.

26. The training method of claim 17, wherein the training comprises:
comparing a sum of squares of input synaptic weights of a neuron included in the neural network to a weight reference value;
determining a weight regulation rate based on a result of the comparing; and
decreasing the input synaptic weights based on the weight regulation rate.

27. The training method of claim 26, wherein the determining of the weight regulation rate comprises:
increasing the weight regulation rate in response to the sum of the squares being greater than the weight reference value; and
decreasing the weight regulation rate in response to the sum of the squares being less than or equal to the weight reference value.

28. The training method of claim 17, wherein the training comprises regulating a membrane potential threshold of neurons included in the neural network based on whether the neurons are activated.

29. The training method of claim 28, wherein the regulating comprises increasing a membrane potential threshold of an activation neuron among the neurons at a rate.

30. The training method of claim 29, wherein the regulating comprises decreasing a membrane potential threshold of the neurons based on a number of neurons sharing a receptive field in a previous layer of neurons and a number of activation neurons included in the previous layer.

31. The training method of claim 17, wherein the regulating comprises increasing a synaptic weight corresponding to each of neurons included in the neural network in response to a membrane potential threshold of the neurons being less than a membrane potential reference value.

32. The training method of claim 17, wherein the training comprises initializing at least one among a membrane potential threshold and synaptic weights of neurons included in a layer of the neural network based on a number of synapses corresponding to each of the neurons.

33. The training method of claim 17, wherein the training comprises normalizing a backpropagation error so that an update value of synaptic weights of neurons included in the neural network is equal to an update value of a membrane potential threshold of the neurons.

34. A non-transitory computer-readable storage medium storing a program comprising instructions to cause a processor to perform the training method of claim 17.

35. A recognition apparatus comprising:
- a memory configured to store a neural network comprising a previous layer of first neurons, and a current layer of second neurons receiving first input signals and second input signals, the first input signals being received from the previous layer, and the second input signals being received from the current layer; and
- a processor configured to generate a recognition result based on the neural network,
- wherein an activation neuron among the second neurons:
  - receives a first input signal among the first input signals; and
  - generates a first output signal to excite or inhibit third neurons of a next layer, and generates a second output signal to inhibit neurons other than the activation neuron of the current layer, in response to a potential of the first input signal being greater than a threshold, and
- wherein each of the other neurons:
  - receives the second output signal from the activation neuron; and
  - decreases a potential of a respective one of the other neurons by a product of a potential threshold of the respective one of the other neurons and a lateral inhibition coefficient of the activation neuron.

* * * * *